US012779378B2

(12) United States Patent
Hemming et al.

(10) Patent No.: US 12,779,378 B2
(45) Date of Patent: Nov. 3, 2026

(54) SYSTEM AND METHOD FOR MONITORING A FLUID FILTER OF A FLUID HANDLING APPARATUS

(71) Applicant: Filtrex Global Ltd., Harlow (GB)

(72) Inventors: Giles Hemming, Harlow (GB); Peter Fox, Harlow (GB)

( * ) Notice: Subject to any disclaimer, the term of this patent is extended or adjusted under 35 U.S.C. 154(b) by 136 days.

(21) Appl. No.: 18/778,267

(22) Filed: Jul. 19, 2024

(65) Prior Publication Data

US 2025/0025815 A1 Jan. 23, 2025

(30) Foreign Application Priority Data

Jul. 20, 2023 (GB) ..................................... 2311169

(51) Int. Cl.
*B01D 35/143* (2006.01)

(52) U.S. Cl.
CPC ................................ *B01D 35/1435* (2013.01)

(58) Field of Classification Search
None
See application file for complete search history.

(56) References Cited

U.S. PATENT DOCUMENTS 7,178,410 B2 2/2007 Fraden et al.
9,183,723 B2 11/2015 Sherman et al.
10,286,343 B2 5/2019 Paluszewski et al.
10,695,706 B2 6/2020 Cho et al.
2013/0126430 A1* 5/2013 Kenley .................. B01D 61/00 210/638
2015/0059583 A1* 3/2015 Cornell .................. B01D 46/71 96/414
2017/0080360 A1 3/2017 Gutierrez et al.
2018/0059175 A1* 3/2018 Hase ...................... G01R 31/52
2018/0185775 A1* 7/2018 Kuhns .................... F02M 37/40
2019/0145663 A1* 5/2019 Huggins ............... F24H 15/345 392/365
2019/0309972 A1* 10/2019 Roen ....................... C02F 1/008
2020/0338954 A1* 10/2020 Eberle ................ B60H 1/00007
2023/0068962 A1* 3/2023 Zambon ............. B01D 46/0086
2023/0201751 A1 6/2023 Mok

FOREIGN PATENT DOCUMENTS

WO WO2021235828 A1 11/2021

* cited by examiner

*Primary Examiner* — Thomas S Mccormack
(74) *Attorney, Agent, or Firm* — Smith Tempel Blaha LLC; Matthew T. Hoots

(57) ABSTRACT

A system and method for monitoring a fluid filter of a handling apparatus includes at least one fluid filter installed in the handling apparatus. The system further includes a sensor arrangement comprising a first sensor assembly configured and arranged to monitor a parameter associated with the condition of the at least one fluid filter. The system further includes a telemetry module configured to transmit condition data related to the parameter associated with the first sensor assembly to a processor at a different location to the handling apparatus. The processor is configured to analyze the condition data over a predetermined period to determine an expected change in fluid filter condition. The processor is also configured to compare the expected change in fluid filter condition with the condition data, and to provide an output when the condition data differs from the expected change in fluid filter condition by a predetermined amount.

20 Claims, 7 Drawing Sheets

SYSTEM AND METHOD FOR MONITORING A FLUID FILTER OF A FLUID HANDLING APPARATUS

FIELD

The present teachings relate to a system and method for monitoring a fluid filter of a handling apparatus, and a method of monitoring a fluid filter of a handling apparatus.

BACKGROUND

Handling apparatuses with fluid filters are typically used in a range of sectors, for example in industrial and manufacturing facilities, in heating, ventilation and air conditioning (HVAC) systems, healthcare systems, laboratories, wastewater treatment and a range of alternative industrial and commercial applications. The fluid filter performs the function of removing impurities and contaminants from fluids, such as water and air. The fluid filter helps to improve the cleanliness and quality of the fluid in various applications.

Fluid filters can become blocked or clogged over time due to the accumulation of contaminants and debris. As the particles, for example dirt, debris, sediment, rust or other impurities get trapped in the fluid filter, the filter media becomes saturated and the available surface for particle capture decreases. If the filter becomes completely blocked, it may fail to effectively filter the fluid, allowing contaminants to bypass the filter. This can result in accelerated equipment wear, a reduction in system efficiency and/or compromised fluid quality. It is therefore necessary that the fluid filter is periodically replaced or serviced in a scheduled maintenance program. The replacement of the fluid filter is generally conservative so that the fluid filter does not fail or deteriorate prior to maintenance, thereby limiting the lifespan of the fluid filter.

The present teachings seek to overcome or at least mitigate one or more problems associated with the prior art.

SUMMARY

A first aspect of the present teaching relates to a system for monitoring a fluid filter of a fluid handling apparatus, the system comprising: at least one fluid filter installed in the fluid handling apparatus; a sensor arrangement comprising a first sensor assembly configured and arranged to monitor a parameter associated with the condition of the at least one fluid filter, and a telemetry module configured to transmit condition data related to the parameter monitored by the first sensor assembly to a processor at a different location to the fluid handling apparatus, wherein the processor is configured to analyze the condition data over a predetermined period to determine an expected change in fluid filter condition; and wherein the processor is configured to compare the expected change in fluid filter condition with the condition data, and to provide an output when the condition data differs from the expected change in fluid filter condition by a predetermined amount.

Advantageously, the system enables remote monitoring of the fluid filter. The monitoring of real time condition data enables servicing, for example maintenance and/or replacement of the fluid filter and fluid filter components, to occur at service life as opposed to according to scheduled maintenance. Such scheduled maintenance is generally conservative so that the fluid filter does not fail or deteriorate prior to maintenance. The use of service life therefore helps to improve lifespan of the fluid filter by reducing the likelihood of premature replacement or servicing. Additionally, the system can be used to enable predictive filter changing to ensure filter changing is carried out before failure of the components of the fluid filter.

The condition data of the fluid filter can be used to determine faults or deterioration of a range of components of the handling apparatus, including the fluid filter. This therefore helps to improve lifespan of the handling apparatus by using condition data of the fluid filter.

The processor may be configured to determine a flow rate of fluid flow through the fluid filter based on the condition data related to the parameter monitored by the first sensor assembly.

Advantageously, the processor is used to determine condition data of the fluid filter relating to flow rate of fluid through the fluid filter because the data can be correlated with different conditions of the fluid filter. Additionally, such sensors for determining flow rate of fluid flow are relatively cheap and simple to integrate with the fluid filter.

The processor may be configured to determine a fluid velocity based on the condition data related to the parameter monitored by the first sensor assembly, and the processor may be configured to determine the flow rate of fluid through the fluid filter based on the fluid velocity.

Advantageously, the fluid velocity can be used to determine the condition of the fluid filter, such as whether the fluid filter is blocked.

The sensor arrangement may comprise a static pressure sensor and at least one dynamic pressure sensor, and the processor may be configured to determine fluid velocity from the dynamic pressure and the static pressure.

The processor may be configured to determine fluid volume outlet from of the fluid filter based on the condition data relating to fluid velocity.

Advantageously, the determination of fluid volume outlet from the fluid filter correlates with the condition of the fluid filter. The determination of a high fluid volume can therefore be used to indicate that the filter is functioning as expected.

The processor may be configured to determine an expected change in fluid volume outlet from the fluid filter, and the processor may be configured to compare the fluid volume outlet from the fluid filter with the expected fluid volume outlet from the fluid filter, and to produce an output indicative of the comparison. The output may be a visual or audio indication.

Advantageously, the fluid quality output is easy to process, and therefore provides a simple way to indicate that the fluid filter is producing the expected fluid volume.

The first sensor assembly may comprise a first dynamic pressure sensor located upstream of the fluid filter, and a second dynamic pressure sensor located downstream of the fluid filter, and the processor may be configured to determine the pressure differential across the fluid filter based on the first and second dynamic pressures.

Advantageously, the pressure differential can be used to determine the condition of the fluid filter, such as whether the fluid filter is blocked.

The output may be configured to indicate a blocked condition of the fluid filter when the condition data differs from the expected change in fluid filter condition by a first predetermined amount.

The output may be configured to indicate a replacement condition of the fluid filter when the condition data differs from the expected change in fluid filter condition by a second predetermined amount.

The output may be configured to indicate a collapsed condition of the fluid filter when the condition data differs from the expected change in fluid filter condition by a third predetermined amount.

The output may be configured to indicate a fault condition of a component of the fluid filter or the handling apparatus when the condition data differs from the expected change in fluid filter condition by a fourth predetermined amount.

Advantageously, the system can be used to indicate a variety of potential faults of the fluid filter and/or the handling apparatus based on the service life. This helps to enable predictive servicing of different components of the fluid filter, and improves the reliability of the fluid filter.

The output may be an alert or a notification.

Advantageously, alerts and notifications are simple means of communicating that the fluid filter may need repair or maintenance.

The processor may be configured to produce a different alert or notification depending on a value of the predetermined amount.

Advantageously, alerts and notifications are simple means of communicating that the fluid filter may need repair or maintenance, and what the repair or maintenance is likely to be. Providing different alerts simplifies the system by automatically communicating the type of maintenance required.

The system may comprise an output device in communication with the processor. The output device may be configured to indicate the alert or notification to the operator. The output device may be an audio and/or display device.

Advantageously, an output device such as an audio and/or display device is a simple way to show the service provider information about the condition of the fluid filter.

The first sensor assembly may be configured to continuously monitor the parameter associated with the condition of the fluid filter.

Advantageously, continuous monitoring helps with timely and accurate data regarding the condition of the filter. This may help ensure filter changing is carried out before failure.

The processor may comprise a memory module configured to store historical condition data monitored by the sensor arrangement.

Advantageously, historical data can be used by the service provider and/or the processor to determine common faults of fluid filters, and patterns associated with each fault can be identified and used to accurately identify faults.

The telemetry module may be configured to transmit condition data related to the parameter from the first sensor assembly to the processor using a radio connection to a gateway hub.

Advantageously, radio connection provides more reliable connectivity compared to, for example, Wi-Fi connection. Additionally, multiple telemetry modules associated with different filters can be connected to the same gateway hub.

The first sensor assembly may comprise at least one fluid quality sensor configured to monitor fluid quality downstream of the fluid filter.

The at least one fluid quality sensor may be configured to monitor at least one of: particulates, carbon dioxide, volatile organic compounds, temperature, and/or humidity.

Advantageously, monitoring of fluid quality, for example these parameters, can help to ensure the fluid filter is delivering the quality of fluid intended for the particular area it is serving.

The sensor arrangement may comprise a mounting arrangement configured to mount the sensor arrangement to the at least one fluid filter, and the mounting arrangement may comprise at least one duct connection point.

The system may comprise a second fluid filter, and the sensor arrangement may comprise a second sensor assembly configured to monitor a parameter associated with a condition of the second fluid filter.

Advantageously, this helps to reduce the number of systems fitted to the fluid filters.

The system may comprise a battery configured to power the sensor arrangement, and the processor may be configured to monitor a level of charge of the battery and produce an output when the level of charge of the battery drops below a predetermined threshold.

Advantageously, maintenance protocols can include changing of battery, thereby reducing the likelihood of the battery dying prematurely and the sensor arrangement being unable to monitor condition data of the fluid filter.

A second aspect of the present teachings relate to a method of monitoring a fluid filter, the method comprising the steps of: monitoring a parameter of the fluid filter; transmitting condition data related to the parameter to a processor located at a different location to the fluid filter; analysing the condition data to determine an expected change in fluid filter condition; comparing the expected change in fluid filter condition with the condition data; and providing an output when the condition data differs from the expected change in fluid filter condition by a predetermined amount.

The output may indicate at least one of the following fluid filter conditions: a blocked condition of the fluid filter; a replacement condition of the fluid filter; a collapsed condition of the fluid filter; a fault condition of a component of the fluid filter or the handling apparatus.

BRIEF DESCRIPTION OF THE DRAWINGS

Embodiments will now be described with reference to the accompanying drawings, in which like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION OF EXEMPLARY EMBODIMENT(S)

The word "exemplary" is used herein to mean "serving as an example, instance, or illustration." Any aspect described herein as "exemplary" is not necessarily to be construed as preferred or advantageous over other aspects.

Figure 1:
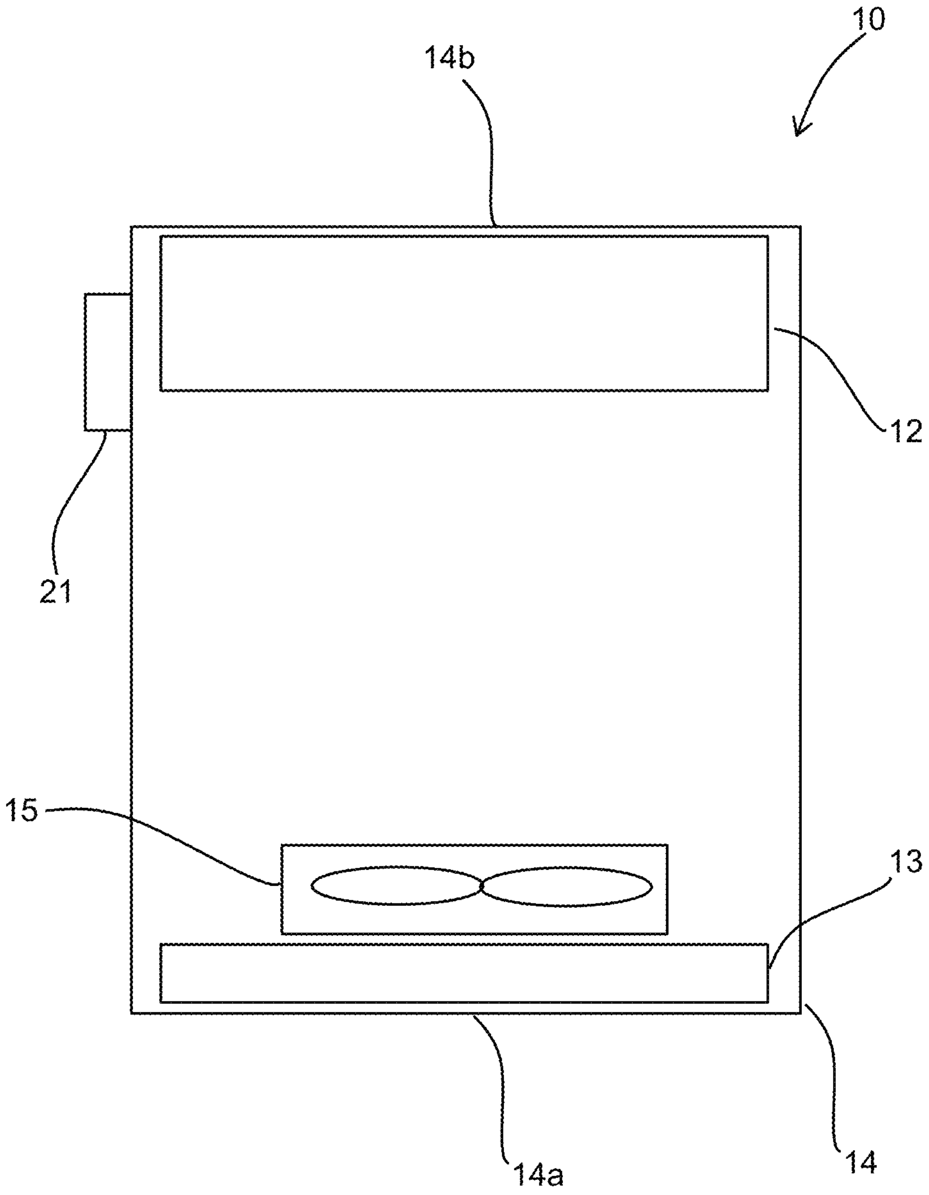
FIG. 1 is a schematic view of a handling apparatus according to the present teachings.

Referring now to FIG. 1, a fluid handling apparatus indicated at 10 is shown. The fluid handling apparatus 10 is taken to mean any apparatus 10 including at least one fluid filter 12. By way of example, the fluid handling apparatus 10 may be a HVAC system, an air purification unit, or a water purification unit. The fluid filtered through the fluid filter 12 may, by way of example, be air or water. Both air and water filters are used in a range of applications to help ensure fluid used in various processes, equipment and products meets quality standards and regulations.

Fluid filters 12 are used to remove contaminants and particles from fluid before it is circulated or used. In the case of an air filter 12, the function is to improve air quality by capturing and trapping dust, pollen, mould spores, bacteria and other airborne particles. In the case of water filters, the water filter may be used to capture and trap sediments, chlorine, bacteria, viruses, pesticides, chemicals and other waterborne particles.

The handling apparatus of FIG. 1 is an air purifying unit 10, however it shall be appreciated that the present teachings are applicable to any fluid, for example air or water, and any suitable handling apparatuses 10 including a fluid filter 12.

The handling apparatus 10 is for industrial use, and is mounted in a duct of an industrial plant. It shall be appreciated that in alternative embodiments, the handling apparatus may be located at any suitable location for filtering fluid, or the handling apparatus 10 may be portable. The handling apparatus 10 includes a housing 14 for housing the fluid filter 12. The housing 14 includes a fluid inlet 14*a*, a fluid outlet 14*b* and a fan or blower 15. The handling apparatus 10 may include any one, or any combination of, a mesh intake screen (not shown), a pre-filter 13, an activated carbon filter (not shown), a HEPA filter 12, a UV-C light unit (not shown), an ionizer (not shown), an electrostatic precipitator (not shown), a heating/cooling coil, dampers and/or a control panel. In the embodiment of FIG. 1, the fluid filter 12 is a HEPA filter, however in alternative embodiments the fluid filter 12 may be any suitable fluid filter. It shall be appreciated that the handling apparatus 10, for example the air purification unit 10, may include more than one fluid filter 12. The handling apparatus 10 may include any of, or any combination of, a pre-filter 13, an activated carbon filter, and a HEPA filter.

Figure 2:
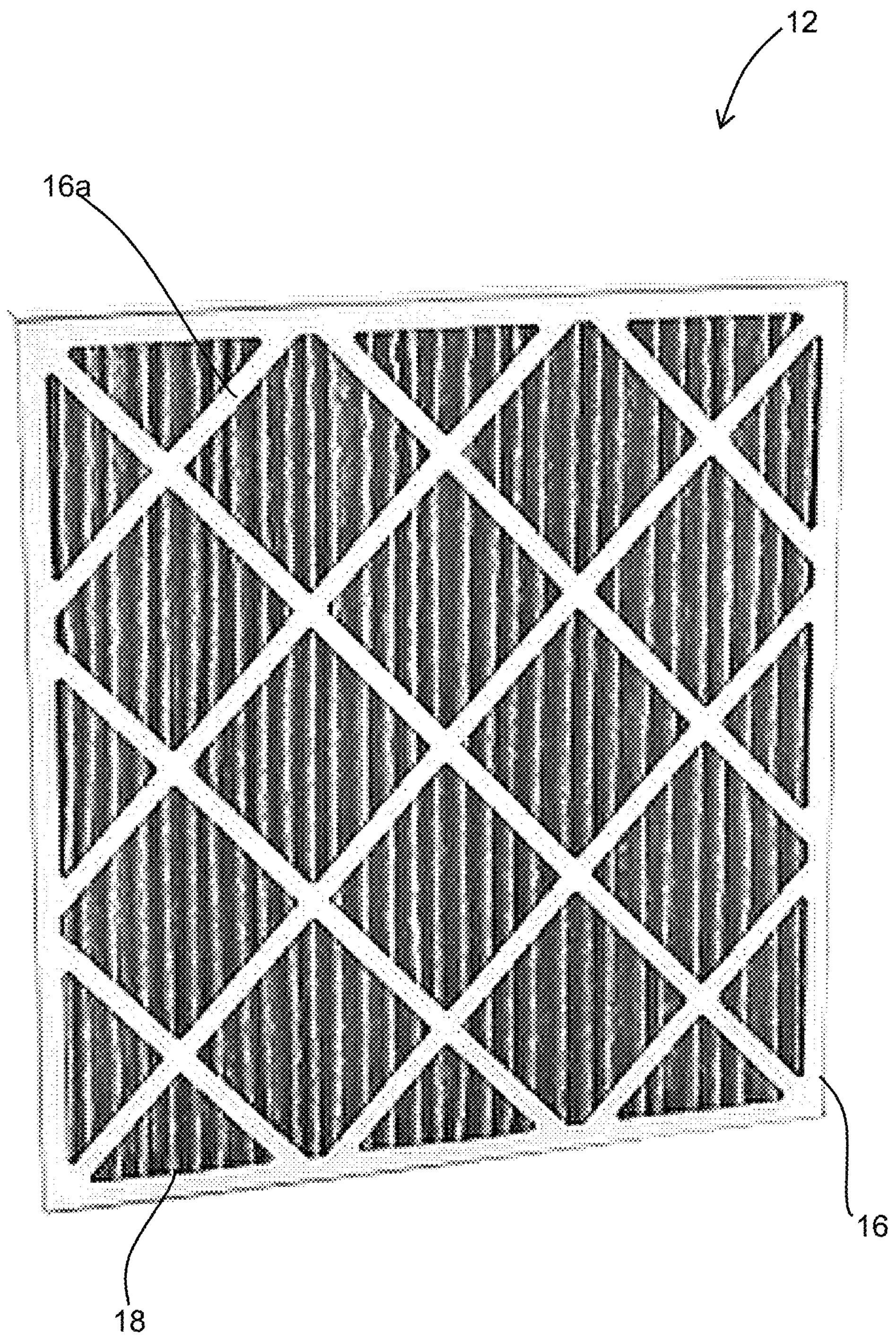
FIG. 2 is front view of a fluid filter of the handling apparatus of FIG. 1.

The fluid filter 12, illustrated in FIG. 2, includes a frame 16 for providing structural support and holding a filter media 18 in place. The fluid filter 12 includes an upstream side and a downstream side with respect to a flow of fluid through the fluid filter 12. The frame 16 may be at least partially manufactured from a polymer or metallic material. The frame 16 is installed within the housing 14 of the handling apparatus 10, for example using mechanical fasteners (not shown). The filter media 18 is configured to capture and trap fluid borne particles. The frame 16 includes a support grid 16*a* placed on the upstream side of the filter media 18. The support grid 16*a* helps to maintain the shape of the fluid filter 12 and to help prevent sagging or collapsing under the pressure of fluid flow through the fluid filter 12. The frame 16 may include any suitable arrangement of gaskets or seals (not shown), for example located around a perimeter of the frame 16. The gasket or seal helps to create a seal between the frame 16 and the filter media 18, and helps to reduce air leakage out of the fluid filter 12.

The filter media 18 is manufactured from a porous material to allow airflow therethrough whilst capturing particles of a size greater than the size of each of the pores. The filter media 18 may be manufactured from any of fibreglass, polyester fibres, synthetic fibres, pleated media or high-efficiency particulate air (HEPA) media. The pleated filter media 18, illustrated in FIG. 2, includes an accordion-like surface to increase the surface area of the filter media 18 for filtration. This arrangement has been found to increase the filter's efficiency and extend its lifespan.

Figure 3:
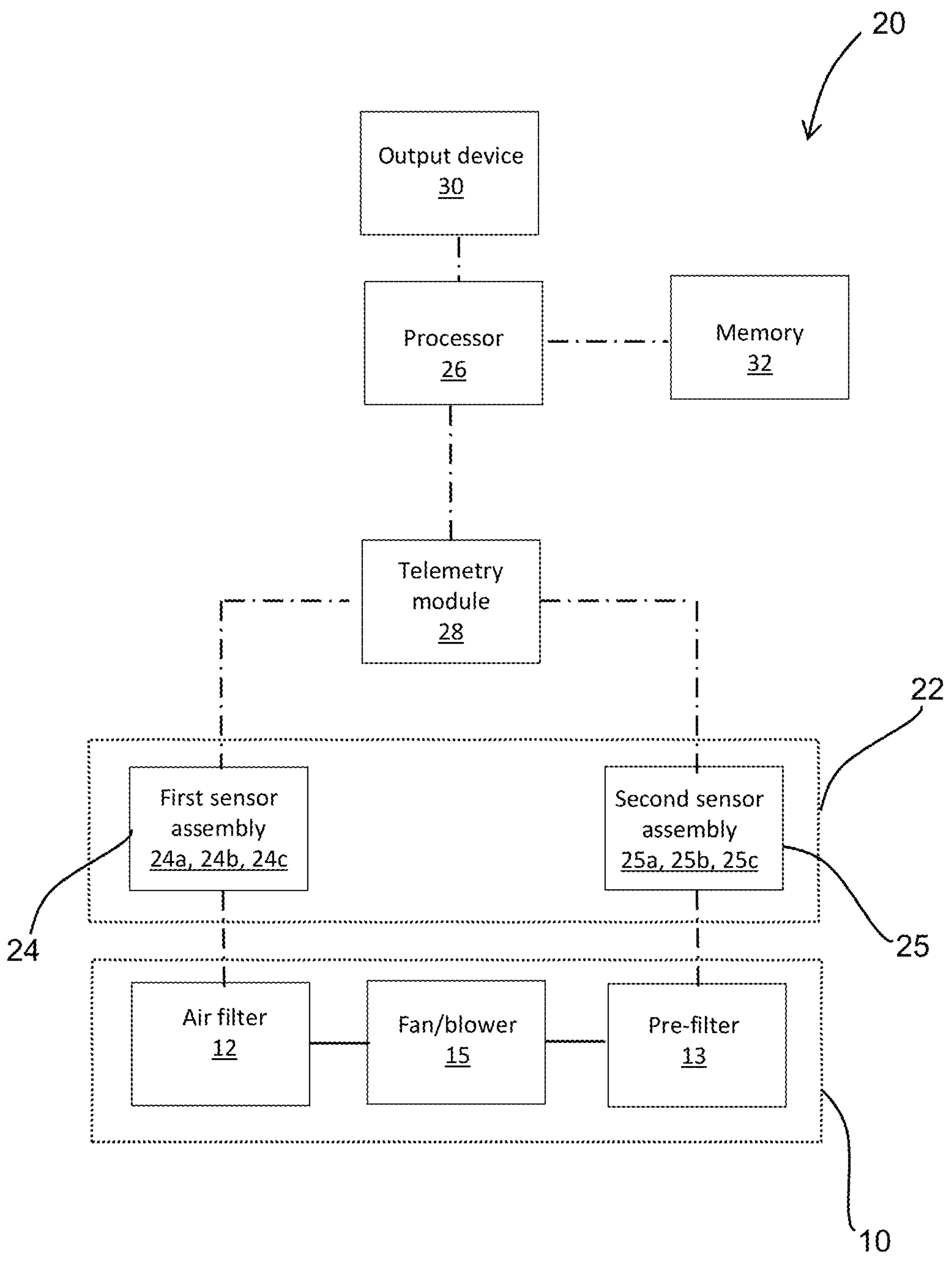
FIG. 3 is a schematic view of a system according to the present teachings for monitoring the fluid filter of FIG. 2.

Referring to FIG. 3, a system 20 is configured to monitor the fluid filter 12 of the handling apparatus 10. The system 20 is intended to be provided as part of a service contract wherein maintenance of the fluid filter 12 and/or the handling apparatus 10 is provided based on condition data of the fluid filter 12 monitored and analyzed by the system 20.

In some embodiments wherein the handling apparatus 10 includes more than one fluid filter 12, 13, the system 20 may be configured to monitor more than one fluid filter 12, 13. The system 20 includes the at least one fluid filter 12 installed in the handling apparatus 10. The system 20 includes a sensor arrangement 22 including a first sensor assembly 24 configured and arranged to monitor a parameter associated with the condition of the at least one fluid filter 12, and a telemetry module 28 configured to transmit condition data related to the parameter associated with the first sensor assembly 24 to a processor 26 at a different location to the handling apparatus 10.

As such, the system 20 enables remote monitoring of the fluid filter 12 and predictive fluid filter maintenance. The monitoring of real time condition data enables servicing, for example maintenance and/or replacement of the fluid filter 12 and fluid filter components, to occur at service life as opposed to according to scheduled maintenance. Such scheduled maintenance is generally conservative so that the fluid filter 12 does not fail or deteriorate prior to maintenance. The use of service life therefore helps to improve lifespan of the fluid filter 12 by reducing the likelihood of premature replacement or servicing. Additionally, the system 20 can be used to enable predictive filter changing to help ensure filter changing is carried out before failure of components of the fluid filter 12.

The system 20 includes a system housing 21 configured to house components of the system 20. The system housing 21 is mounted to the housing 14 of the handling apparatus 10, for example using fasteners (not shown). The system 20 may house the sensor arrangement 22 and/or the telemetry module 28.

The processor 26 may be any suitable microprocessor or logic circuit. The processor 26 is configured to continuously monitor condition data of the fluid filter 12. The processor 26 is configured to analyze the condition data over a predetermined period to determine an expected change in fluid filter condition. The processor 26 may use an algorithm to determine the expected change in fluid filter condition. The processor 26 is configured to compare the expected change in fluid filter condition with the condition data, and to provide an output when the condition data differs from the expected change in fluid filter condition by a predetermined amount. The condition data of the fluid filter 12 can be used to determine faults or deterioration of a range of components of the handling apparatus 10, including the fluid filter 12. This therefore helps to improve the lifespan of the handling apparatus 10 and/or the fluid filter 12.

It shall be appreciated that the value of the predetermined amount may be selected such that maintenance is carried out before failure or significant reduced performance of the fluid filter 12. As such, the system 20 enables predictive maintenance to help ensure fluid filter changing occurs before the performance of the fluid filter 12 decreases below an allowable level.

The telemetry module 28 enables the transmission of data from remote locations, i.e. from the location of the handling apparatus 10, to a central system, including the processor 26, for monitoring and analysis of the transmitted condition data. The telemetry module 28 helps to enable real-time condition data monitoring and transmission of the condition data, for example in a data package. The telemetry module 28 may be located in the system housing 21, i.e. mounted to the housing 14 of the handling apparatus 10.

The telemetry module 28 is configured to transmit condition data related to the parameter from the first sensor assembly 24 to the processor 26 via a radio connection gateway hub, for example using a low power radio link. The radio connection provides more reliable connectivity compared to, for example, Wi-Fi connection. This is particularly advantageous when the handling apparatus 10 is located in a remote location with limited Wi-Fi connection. The radio connection gateway hub may be configured to aggregate data from multiple sensors. The radio connection gateway hub is therefore able to receive condition data from multiple telemetry modules (for example associated with different handling apparatuses 10 located on the same or nearby sites) connected to the same radio connection gateway hub. The radio connection gateway hub is configured to transmit the condition data to a cloud platform or central server in communication with the processor 26. This arrangement means that the condition data may be accessed worldwide, for example to all users with a login. It shall be appreciated that in alternative embodiments, a Wi-Fi connection, a cellular connection or a Bluetooth connection may be used by the telemetry module 28 to transmit the condition data.

The processor 26 includes a memory module 32 configured to store historical condition data monitored by the sensor arrangement 22. The historical condition data can be used by the service provider and/or the processor as part of the service contract to determine common faults of fluid filters, and patterns associated with each fault can be identified and used to accurately identify the maintenance protocol required. The processor 26 is configured to produce an output to a user or operator indicative of historical condition data based on a user selection. By way of example, the output may be a plot of condition data over time, as illustrated in FIGS. 4*a* and 4*b*, and the user may be able to select a time period to view.

The processor 26 is configured to communicate the output to the user or operator via the output device 30. The output may be an alert or notification. The alert or notification may differ depending on the fluid filter condition, as will be described in more detail below. The processor 26 is in communication with an output device 30, for example an indicator or display 30. The processor 26 is configured to indicate or display the output to the operator via the output device 30. The output device 30 may be an audio and/or display device 30. The output device 30 is configured to indicate the alert or notification to the operator. The alert or notification may be an instruction or a warning. The output device 30 may be configured to indicate more than one output simultaneously to the user.

The output device 30 may be configured to continuously display real-time data indicative of the condition of the fluid filter 12 to the user or operator. Examples of the display of real-time data are illustrated in FIGS. 4*a* and 4*b*. The use of a graph enables the user to easily understand the pattern of the data, i.e. whether there has been a sudden drop or rise in pressure or velocity, or a slow decline or increase in pressure or velocity.

Figure 4A:
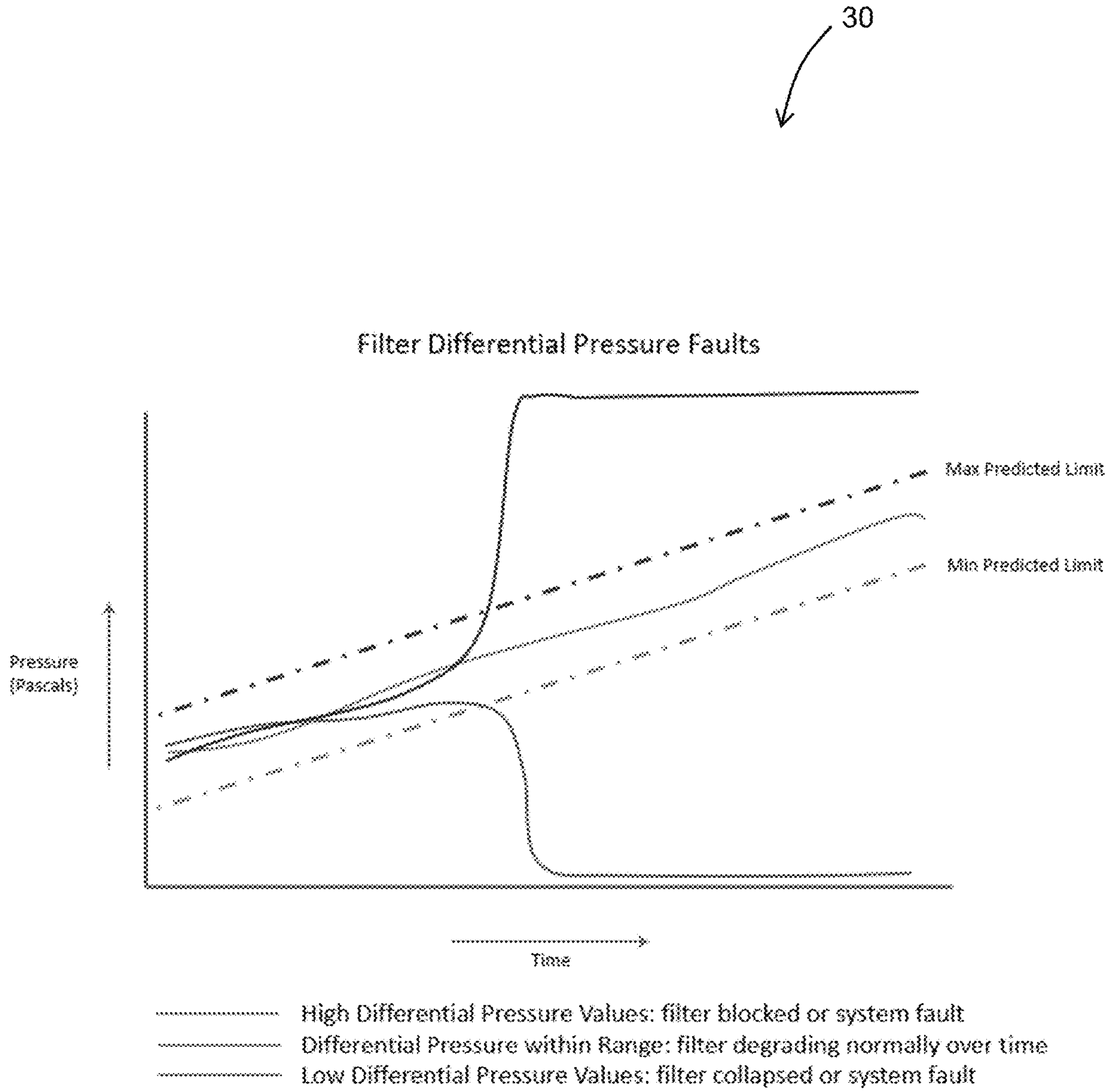
FIGS. 4*a* and 4*b* are schematic views of an output of the system of FIG. 3.
Figure 4B:
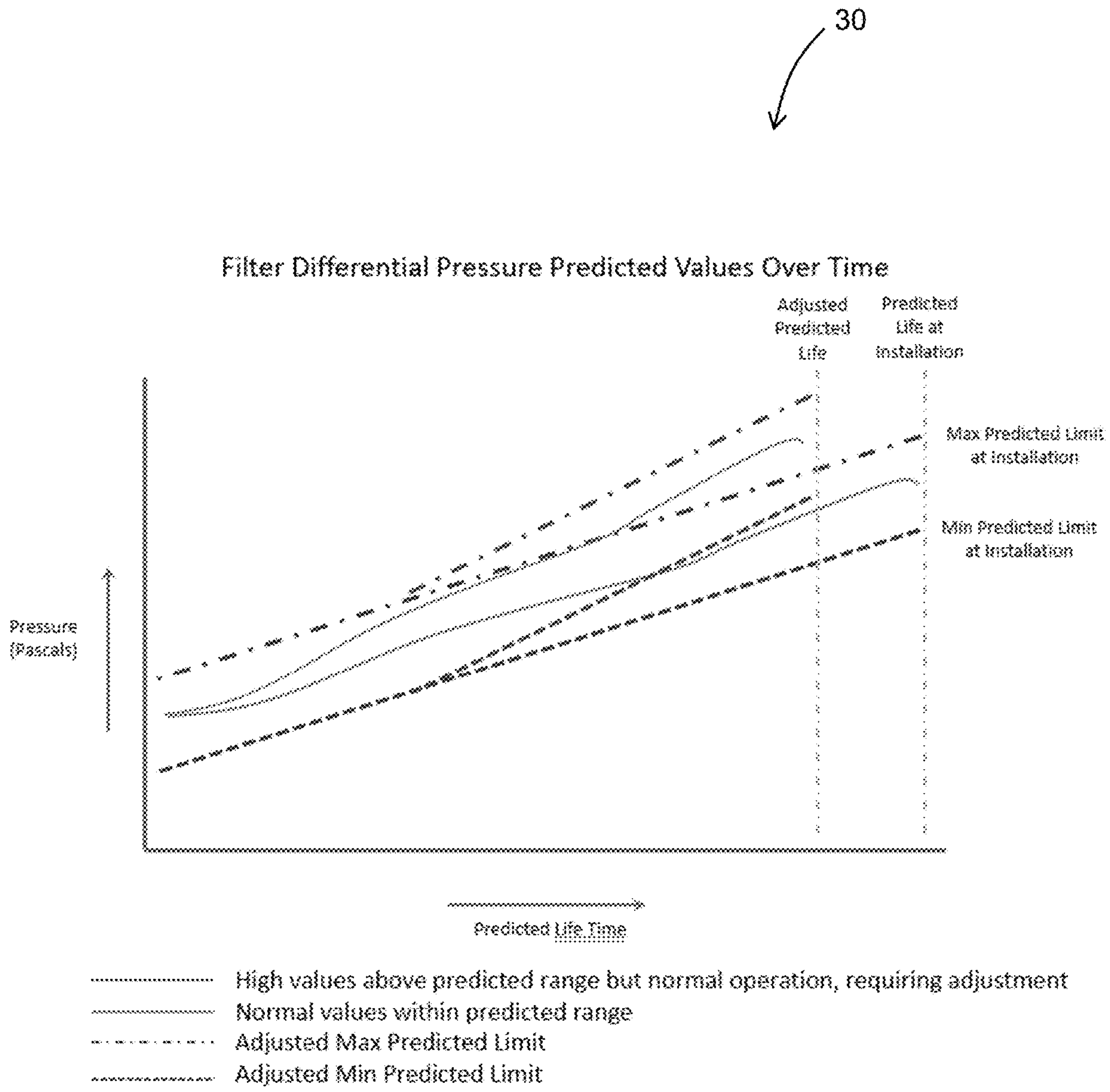

FIG. 4*a* illustrates the display of pressure condition data, and FIG. 4*b* illustrates the predicted pressure limit at installation and real-time condition data being used to determine the expected condition data. FIG. 4*a* shall be described in more detail below in relation to different conditions of the fluid filter 12. In FIG. 4*b*, maximum and minimum limits are predicted at installation. FIG. 4*b* illustrates how the real-time condition data is used to adjust the maximum and minimum limits to determine the maximum and minimum expected condition of the fluid filter 12, illustrated by the upper dashed line and the lower dashed line. These adjusted maximum and minimum limits are used in FIG. 4*a* to compare with the real-time condition data.

The system 20 includes a battery (not shown) configured to power the sensor arrangement 22. The processor 26 is configured to monitor a level of charge of the battery and produce an output when the level of charge of the battery drops below a predetermined threshold. The battery can therefore be changed as part of a maintenance protocol, thereby decreasing the likelihood of the battery dying prematurely and the sensor arrangement 22 being unable to monitor condition data of the fluid filter 12.

The sensor arrangement 22 includes a mounting arrangement (not shown) configured to mount the sensor arrangement 22 to the at least one fluid filter 12. This arrangement enables the sensor arrangement 22 to monitor the fluid filter 12 whilst being located within the system housing 21. The mounting arrangement includes at least one duct connection point. The duct connection points are used to connect pressure connection points (not shown) of the fluid filter 12 to the sensor arrangement 22. In some embodiments, the sensor arrangement 22 may be connectable to a duct located downstream of the fluid filter, for example via a fixed pilot tube. It shall be appreciated that in alternative embodiments, the sensor arrangement 22 may be integrated with the housing 14 of the fluid handling apparatus 10.

The sensor arrangement 22 may be calibrated at regular intervals to help improve reliability and accuracy of measurements. It shall be appreciated that the processor 26 may be configured to determine when the sensor arrangement 22 should be recalibrated, for example based on the condition data. Calibration may, by way of example, occur prior to installation of the system 20, or at the point of installation. The sensor arrangement 22 may be calibrated annually, or each time the fluid filter 12 is serviced.

The processor 26 is configured to determine a flow rate of fluid flow through the fluid filter 12 based on the condition data related to the parameter monitored by the first sensor assembly 24. The processor 26 is configured to determine a fluid velocity based on the condition data related to the parameter monitored by the first sensor assembly 24. The processor 26 is configured to determine the flow rate of fluid through the fluid filter 12 based on the fluid velocity. Determining the flow rate of fluid helps to determine the condition of the fluid filter 12.

The first sensor assembly 24 is configured to continuously monitor the parameter associated with the condition of the fluid filter 12. In the embodiment of FIG. 3, the first sensor assembly 24 is configured to monitor pressure of the fluid filter 12. It shall be appreciated that in an alternative embodiments, an alternative sensor may be used by the processor 26 to determine flow rate and fluid velocity, for example an anemometer. The system 20 may include an expansion port (not shown) to allow the fitment of additional sensors, such as a sensor for determining flow rate and fluid velocity.

The first sensor assembly 24 includes a static pressure sensor 24*a* and at least one dynamic pressure sensor 24*b*, 24*c*. The static pressure sensor 24*a* is configured to monitor the static pressure of the fluid filter 12. The static pressure sensor 24*a* may be configured to monitor pressure downstream of the fluid filter 12. The dynamic pressure sensor

24*b*, 24*c* is configured to monitor the dynamic pressure of the fluid filter 12. In the embodiment of FIG. 3, the first sensor assembly 24 includes first and second dynamic pressure sensors 24*b*, 24*c*. The first dynamic pressure sensor 24*b* may be configured to monitor fluid pressure upstream of the fluid filter 12, and the second dynamic pressure sensor 24*c* may be configured to monitor fluid pressure downstream of the fluid filter 12.

The processor 26 is configured to determine pressure velocity from the dynamic pressure and the static pressure. In the embodiment of FIG. 3, the processor 26 uses the dynamic pressure measured by the second dynamic pressure sensor 24*c* (i.e. the dynamic pressure downstream of the fluid filter 12) to determine the pressure velocity. In order to monitor the static and dynamic pressure to determine pressure velocity, the first sensor assembly 24 may be connected to a duct located downstream of the fluid filter 12, for example via the fixed pilot tube.

The processor 26 uses the pressure velocity to determine the fluid velocity downstream of the fluid filter 12. The processor 26 therefore uses the total pressure and the static pressure to determine fluid velocity of the fluid filter 12. A decrease in the fluid velocity of the fluid filter 12 is used to indicate that the fluid filter 12 is becoming blocked or clogged. The processor 26 is configured to determine fluid volume outlet from the fluid filter 12 based on the condition data relating to the fluid velocity and the cross-sectional area of the fluid filter 12. The cross-sectional area of the fluid filter 12, and/or any alternative set parameters of the fluid filter 12 such as fluid filter type, fluid filter density and density of the fluid passing through the fluid filter 12 may be inputted into the processor by the user prior to monitoring of the fluid filter 12 commencing. The set parameters may be inputted as upper and lower thresholds. The set parameters are stored in the memory module 32. For example, the set parameters of the fluid filter 12, such as cross-section area, may be inputted during a setup procedure. The user may be able to select the fluid filter type and/or handing apparatus monitored by the system 20, and the processor 26 may store parameters associated with each type of fluid filter 12. The set parameters may be used to determine the expected condition of the fluid filter 12.

The determination of fluid volume outlet from the fluid filter 12 correlates with the condition of the fluid filter 12. The determination of a high fluid volume outlet from the fluid filter 12 can therefore be used to indicate that the fluid filter 12 is functioning as expected. The processor 26 is configured to determine an expected change in fluid volume outlet from the fluid filter 12. The processor 26 is configured to compare the determined fluid volume outlet from the fluid filter 12 with the expected fluid volume outlet from the fluid filter 12 and to produce an output indicative of the comparison. The output may be, by way of example, an air volume quality index for communicating air quality based on the comparison of expected fluid volume outlet from the fluid filter 12 and expected fluid volume outlet from the fluid filter 12. The air volume quality index may be communicated to a customer as a way of validating that the fluid filter 12 is functioning as expected.

Additionally or alternatively, the first and second dynamic pressure sensors 24*b*, 24*c* may be configured to measure the pressure differential across the fluid filter 12. The pressure differential across the fluid filter 12 is indicative of the condition of the fluid filter 12, as will be described in more detail below. The first and second dynamic and/or static pressure sensors 24-*c* may be any suitable pressure sensor, for example strain gauges, capacitive sensors, aneroid barometer pressure sensors, manometer pressure sensors, bourdon tube pressure sensors, vacuum pressure sensors, sealed pressure sensors and/or piezoelectric sensors. In this embodiment, the dynamic and/or static pressure sensors 24*a-c* may be piezoresistive silicon pressure sensors. The pressure differential is converted into an electric signal, which is processed and analyzed by the processor 26 and used to produce the output. In alternative embodiments, the first sensor assembly 24*a-c* may use a pressure transducer. The pressure differential across the fluid filter 12 represents the resistance to fluid flow through the fluid filter 12, therefore the pressure differential increases as the fluid filter 12 becomes blocked.

The first sensor assembly 24 may be include at least one fluid quality sensor configured to monitor fluid quality downstream of the fluid filter 12. In the embodiment of FIG. 2, where the fluid filter 12 is an air filter 12, the first sensor assembly 24 may be configured to monitor at least one of: particulates, carbon dioxide, volatile organic compounds, temperature and/or humidity. The monitoring of fluid quality can help to ensure the fluid filter 12 is delivering the quality of fluid intended for the particular area it is serving. The first sensor assembly 24 may include any suitable number of sensors for monitoring fluid quality, for example one or more sensors. By way of example, the first sensor assembly 24 may include any one, or any combination of: optical particle counters, carbon dioxide monitors, volatile organic compound monitors, electrochemical sensors, photoionization detectors, a temperature sensor and/or a humidity sensor.

In embodiments where the fluid filter 12 is a water filter, the first sensor assembly 24 may be configured to monitor at least one of: particulates, carbon dioxide, volatile organic compounds and temperature. It shall be appreciated that in alternative embodiments, the first sensor assembly 24 may be configured to monitor any suitable parameter of fluid quality.

The processor 26 may be configured to use both the condition data relating to pressure and the condition data relating to fluid velocity to verify the output. By way of example, if the processor 26 determines there has been an increase in pressure, but not an increase in velocity, then this could indicate an anomalous results, for example caused by a fault in the sensor arrangement 22. The use of both the pressure and the fluid velocity may therefore increase the reliability of the output.

In embodiments where the sensor arrangement is configured to monitor more than one fluid filter, for example the pre-filter 13, the sensor arrangement 22 may include a second sensor assembly 25 for monitoring the second fluid filter 13. It shall be appreciated that the teachings relating to the first sensor assembly 24 are applicable to the second sensor assembly 25 for example the pressure sensors 25*a-c*. It shall be appreciated that the number of sensor assemblies 24, 25 may correspond to the number of fluid filters 12, 13 monitored by the sensor arrangement. It shall be appreciated that in alternative embodiments, the second sensor assembly may be omitted.

The value of the predetermined amount determined by the processor 26 is indicative of different conditions of the fluid filter 12 and/or the handling apparatus 10. Put another way, the processor 26 is configured to produce a different output, e.g. a different alert or notification, depending on a value of the predetermined amount. The output may be configured to indicate a blocked condition of the fluid filter 12 when the condition data differs from the expected change in fluid filter condition by a first predetermined amount. The blocked condition may be a partially blocked condition of the fluid filter 12. In the case of pressure differential across the fluid filter 12 the first predetermined amount represents a pressure increase. In the case of fluid velocity through the fluid filter 12, the first predetermined amount represents a decrease in fluid velocity. It shall be appreciated that the magnitude of the predetermined amount is dependent on the viscosity of the fluid passing through the fluid filter 12 and the size of the fluid filter 12, as well as a number of other parameters.

It shall be appreciated that as the fluid filter 12 is expected to become blocked over time, the pressure differential of the expected condition data increases over time, as illustrated in FIG. 4*a*. The middle solid line on the plot of FIG. 4*a* schematically illustrates the fluid filter 12 becoming blocked over time. It shall therefore be appreciated that if the pressure differential of the fluid filter 12 follows the trend of the expected change in fluid filter condition, the processor 26 may only produce the output when time is equal to or just before the adjusted predictive life value, illustrated by a vertical dashed line in FIG. 4*b*.

The output may be configured to indicate a replacement condition of the fluid filter 12 when the condition data differs from the expected change in fluid filter condition by a second predetermined amount. The fluid filter 12 may need replacing when the blockage of the fluid filter 12 causes the pressure and/or fluid velocity of the fluid filter 12 to reach the second predetermined amount. The second predetermined amount is therefore a value greater than the first predetermined amount. By way of example, a new clean filter may have a measured pressure differential of 100 pascals, and this value may increase to 300 pascals when the air filter 12 needs replacing. The uppermost solid line on the plot of FIG. 4*a* schematically illustrates an increase in the pressure differential condition data, which may indicate a blocked fluid filter 12 which needs replacing.

The output may be configured to indicate a collapsed condition of the fluid filter 12 when the condition data differs from the expected change in fluid filter condition by a third predetermined amount. In the case of pressure differential across the fluid filter 12 the third predetermined amount represents a pressure decrease. In the case of fluid velocity through the fluid filter 12, the third predetermined amount represents an increase in fluid velocity. The collapse of the fluid filter 12 is likely to result in a sudden peak or trough of the condition data (i.e. a sudden deviation from the expected condition of the fluid filter 12). The third predetermined amount may therefore be greater than the first and second predetermined amounts, or may be the same or less than the first and second predetermined amounts.

If the collapsed fluid filter 12 results in the filter medium 18 coming away from the frame 16, this would be likely to cause unrestricted flow of fluid, therefore a value close to zero would be measured as the pressure differential and the flow velocity would increase. If the filter medium 18 travels downstream the handling apparatus 10 and blocks another part of the handling apparatus 10, the pressure differential would still be close to zero but the flow velocity may be reduced. The lowermost solid line on the plot of FIG. 4*a* schematically illustrates a drop in the pressure differential condition data, which may indicate a collapsed fluid filter 12.

The output is configured to indicate a fault condition of a component of the fluid filter 12 or the handling apparatus 10 when the condition data differs from the expected change in fluid filter condition by a fourth predetermined amount. The fourth predetermined amount my include a plurality of different predetermined amounts, each indicative of a different fault of the fluid filter 12 or the handling apparatus 10. The fourth predetermined amount may be different to the first, second and third predetermined amounts.

It shall be appreciated that the first, second, third and fourth predetermined amounts are exemplary, and there may be any suitable number of predetermined amounts depending on the number of detectable fault conditions.

The system 20 may be configured to determine a fault in any one of the components of the fluid filter 12 or the handling apparatus 10. By way of example, the system 20 may be configured to determine a fault with any one or more of the filter frame 16, the filter media 18, the support grid 16*a*, the gasket or seal, and/or the pleat separators, the fan 15 and/or the belt drive. In embodiments wherein the handling apparatus 10 is an alternative handling apparatus, for example a water purification unit, the system may additionally or alternatively be configured to determine a fault with any one or more of a valve, a tubing or fitting, a storage tank, or a dispenser.

Table 1 below outlines some exemplary faults associated with components of the fluid filter, and the expected pressure difference/velocity.

TABLE 1

| Fault | Pressure differential | Velocity |
|---|---|---|
| Filter blocked | High | Low |
| Filter missing | Low | High |
| Filter collapsed | Low | High |
| Filter blocking duct | Low | Low |
| Fluid/air pressure tube split | High in reference to ambient pressure | |

The system 20 can therefore be used to indicate a variety of potential faults of the fluid filter 12 based on the service life, and to predict when maintenance of each component should occur. This helps to enable predictive servicing of different components of the air filter 12, and improves the reliability of the fluid filter 12.

The output differs depending on the value of the predetermined amount, i.e. whether the predetermined amount is equal to the first, second, third or fourth predetermined amount. By way of example, the output may be a different instruction depending on the type of fault determined by the processor 26. The instruction may be to replace the fluid filter 12, unblock the fluid filter 12, repair the fluid filter 12 (for example with a specific repair instruction), or to replace or repair a component of the fluid filter 12 or the handling apparatus 10. The output may be a warning message when the fluid filter is becoming blocked, and a repair instruction when the fluid filter 12 needs replacing.

It shall be appreciated that in some embodiments, the processor 26 is configured to store maintenance information and protocols in the memory module 32. The user may then be able to select the suggested maintenance information or protocol, and use the information to repair/service the fluid filter 12 or the handling apparatus 10. It shall be appreciated that when the system 20 is provided as part of a service contract, the user may schedule maintenance based on the output (i.e. as opposed to the user servicing the fluid filter 12 or handling apparatus 10 themselves).

Figure 5:
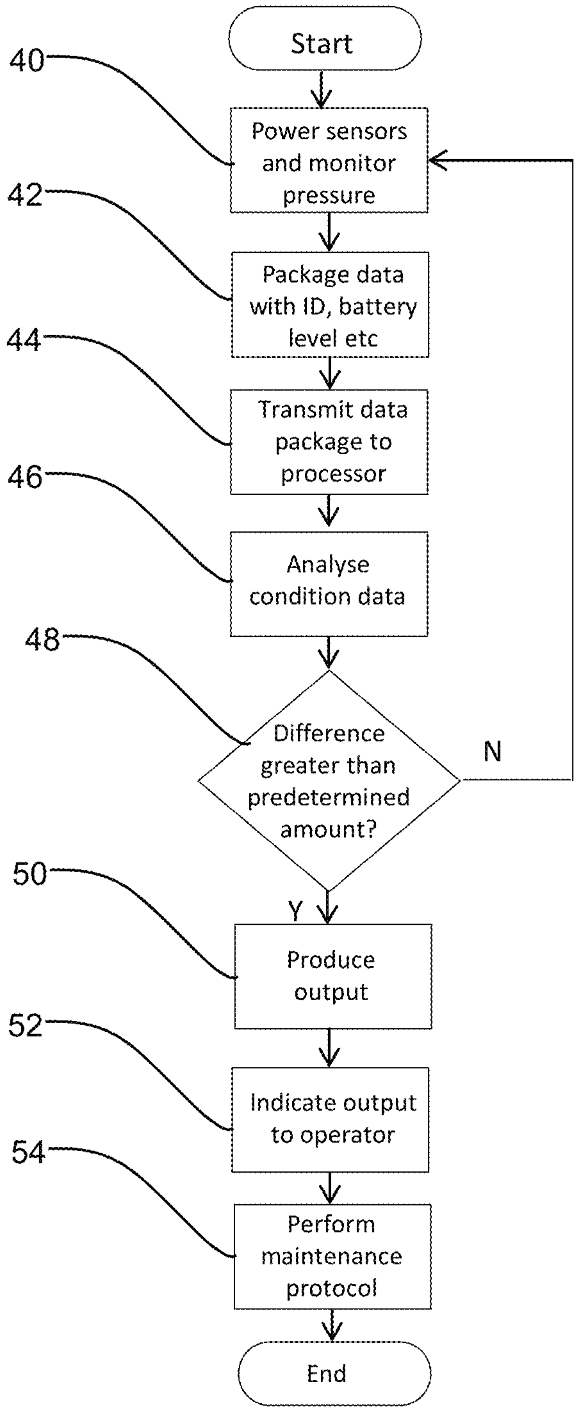
FIG. 5 is an embodiment of the control logic followed by the system of FIG. 3.

FIG. 5 illustrates an embodiment of the control logic followed by the processor 26 to monitor the fluid filter 12.

The sensor arrangement 22 is powered, for example by the battery, at step 40, and used to monitor the parameter of the fluid filter 12. The sensor arrangement 22 monitors parameters associated with the condition of the fluid filter 12, for example pressure differential, flow rate and/or fluid quality. The monitoring of the parameter is continuous in the embodiment of FIG. 5. At step 42, the condition data is packaged by the telemetry module 28. By way of example, the data package may include condition data relating to pressure differential across the fluid filter 12, condition data relating to flow rate through the fluid filter 12, condition data relating to air quality and/or condition data relating to the level of charge in of the battery. The data package is transmitted by the telemetry module 28 over radio link to the radio connection gateway hub at step 44. The processor 26 is therefore able to access the data package, for example via the cloud.

At step 46, the processor 26 analyzes the condition data. The processor 26 may determine the expected condition of the fluid filter 12, the pressure differential of the fluid filter 12 over time, the pressure velocity over time, the fluid volume outlet by the fluid filter 12 over time, the air quality over time, and/or the level of charge of the battery. The processor 26 compares the expected change in fluid filter condition with the condition data. At step 48, the processor 26 determines whether the condition data differs from the expected change in fluid filter condition by the predetermined amount. As discussed above, a plurality of different predetermined amounts are provided depending on the condition of the fluid filter 12.

If the difference is less than the predetermined amount, the control logic loops back to step 40 and the sensor arrangement 22 continues to monitor the parameter of the fluid filter 12. If the difference is greater than or equal to the predetermined amount, the processor 26 produces the output at step 50. The output is dependent on the value of the predetermined amount. The output is displayed on the outlet device 30 at step 52. At step 54, maintenance (such as repair or replacement) on the fluid filter 12 or handling apparatus 10 is performed, if required.

Figure 6:
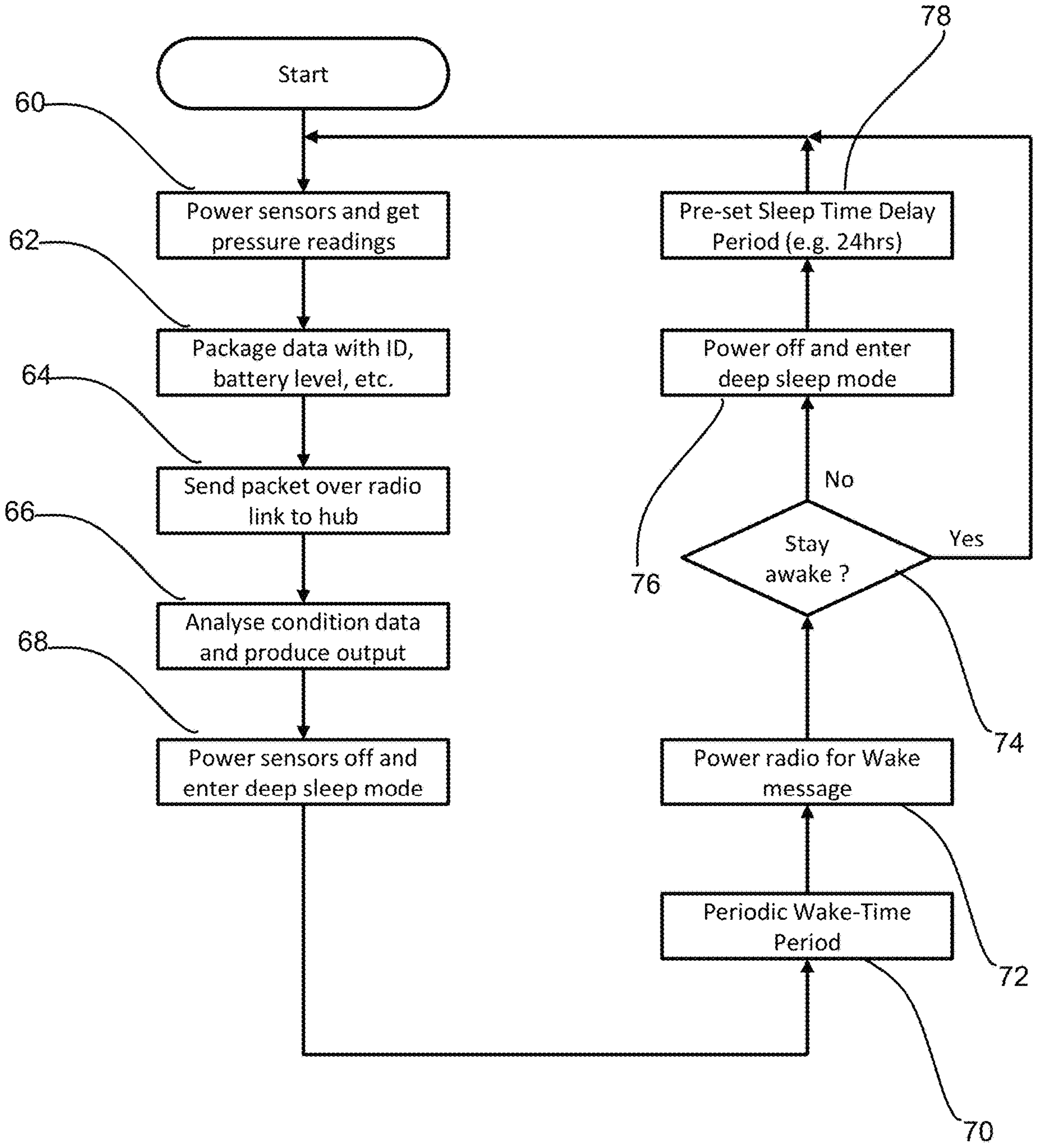
FIG. 6 is an alternative embodiment of the control logic followed by the system of FIG. 3.

FIG. 6 illustrates an alternative embodiment of the control logic followed by the processor 26 to monitor the fluid filter 12. It shall be appreciated that the control logic of FIG. 6 may be integrated with the control logic of FIG. 5, however for reasons of clarity, the branches of control logic have been described separately.

The sensor arrangement 22 is powered, for example by the battery, at step 60, and used to monitor the parameter of the fluid filter 12. At step 62, the condition data is packaged by the telemetry module 28 and at step 64 the data package is transmitted by the telemetry module 28 over radio link to the radio connection gateway hub.

At step 66, the processor 26 analyzes the condition data. The processor 26 may determine the expected condition of the fluid filter 12, the pressure differential of the fluid filter 12 over time, the pressure velocity over time, the fluid volume outlet by the fluid filter 12 over time, the air quality over time, and/or the level of charge of the battery. The processor 26 compares the expected change in fluid filter condition with the condition data. The processor 26 determines whether the condition data differs from the expected change in fluid filter condition by the predetermined amount, as described above.

Steps 68 to 78 show control logic for increasing the battery life of the system 20. At step 68, the sensor arrangement 22 enters deep sleep mode. In deep sleep mode, the sensor arrangement 22 does not communicate data to the telemetry module 28. This helps to reduce the charge from the battery required to power the sensor arrangement 22. After a predetermined period of time, referred to as a "wake-time" period, the telemetry module 28 comes out of sleep mode at step 70 and powers on the sensor arrangement 22. Data from the sensor arrangement 22 is captured and packaged up with the module serial number and other associated data. The data is transmitted over the radio link to the gateway. On successful transmission, the telemetry module 28 powers the sensors and radio down and returns to deep sleep mode. If a back-end dashboard in communication with the processor 26 (or the processor itself 26) requests the telemetry module 28 to stay awake for continuous transmission of real-time data, the telemetry module 28 will remain awake until instructed to sleep. The processor 26 may indicate the "wake" message, illustrated at step 72, to the user or operator when in wake mode. The sensor arrangement 22 may be powered at the "wake-time" and condition data may be transmitted to the processor 26. At step 74, the processor 26 determines whether the sensor arrangement 22 should power up or return to deep sleep mode. The processor 26 may make the determination automatically, for example based on the comparison between the condition data and the expected condition data, or based on an input from the user or operator. If the processor 26 determines that the sensor arrangement 22 should monitor the parameter of the fluid filter 12, the control logic loops back to step 60. If the dashboard tells the processor 26 that the sensor arrangement 22 should return to deep sleep mode, the sensor arrangement 22 is powered off at step 76.

At step 78, the processor 26 sets a pre-set sleep time delay period. By way of example, the pre-set sleep time delay period may be 24 hours. After the pre-set sleep time delay, the control logic loops back to step 60 and the sensor arrangement 22 is powered by the battery.

A method of monitoring a fluid filter shall be described hereafter. The method includes monitoring the parameter of the fluid filter and transmitting the condition data related to the parameter to the processor 26 located at a different location to the handling apparatus 10. The processor 26 analyzes the condition data to determine an expected change in fluid filter condition. The processor 26 compares the expected change in fluid filter condition with the condition data. The processor 26 produces the output when the condition data differs from the expected change in fluid filter condition by a predetermined amount.

The output may include a maintenance instruction. The user, or person monitoring the output device 30, may perform the maintenance protocol themselves. Alternatively, the user may contact an engineer to perform the maintenance, or input the maintenance protocol into any suitable system. As such, the maintenance protocol is performed based on the service life of the fluid filter 12.

Although the teachings have been described above with reference to one or more preferred embodiments, it will be appreciated that various changes or modifications may be made without departing from the scope as defined in the appended claims.

What is claimed is:

1. A system for monitoring a fluid filter of a fluid handling apparatus, the system comprising:
- at least one fluid filter installed in the fluid handling apparatus;
- a sensor arrangement comprising a first sensor assembly configured and arranged to monitor a parameter associated with a condition of the at least one fluid filter, and
- a telemetry module configured to transmit condition data related to the parameter monitored by the first sensor assembly to a processor at a different location to the fluid handling apparatus, wherein the processor is configured to analyze the condition data over a predetermined period to determine an expected change in fluid filter condition; and wherein the processor is configured to compare the expected change in fluid filter condition with the condition data, and to provide an output when the condition data differs from the expected change in fluid filter condition by a predetermined amount;

wherein the processor is configured to determine a flow rate of fluid flow through the fluid filter based on the condition data related to the parameter monitored by the first sensor assembly; and wherein the processor is configured to determine a fluid velocity based on the condition data related to the parameter monitored by the first sensor assembly, and wherein the processor is configured to determine the flow rate of fluid through the fluid filter based on the fluid velocity.

2. The system according to claim 1, wherein the sensor arrangement comprises a static pressure sensor and at least one dynamic pressure sensor, and wherein the processor is configured to determine fluid velocity from the dynamic pressure and the static pressure.

3. The system according to claim 1, wherein the processor is configured to determine fluid volume outlet from of the fluid filter based on the condition data relating to fluid velocity.

4. The system according to claim 1, wherein the processor is configured to determine an expected change in fluid volume outlet from the fluid filter, and wherein the processor is configured to compare the fluid volume outlet from the fluid filter with the expected fluid volume outlet from the fluid filter, and to produce an output indicative of the comparison, optionally wherein the output is a visual or audio indication.

5. The system according to claim 1, wherein the first sensor assembly comprises a first dynamic pressure sensor located upstream of the fluid filter, and a second dynamic pressure sensor located downstream of the fluid filter, and wherein the processor is configured to determine the pressure differential across the fluid filter based on the first and second dynamic pressures.

6. The system according to claim 1, wherein the output is configured to indicate a blocked condition of the fluid filter when the condition data differs from the expected change in fluid filter condition by a first predetermined amount.

7. The system according to claim 1, wherein the output is configured to indicate a replacement condition of the fluid filter when the condition data differs from the expected change in fluid filter condition by a second predetermined amount.

8. The system according to claim 1, wherein the output is configured to indicate a collapsed condition of the fluid filter when the condition data differs from the expected change in fluid filter condition by a third predetermined amount.

9. The system according to claim 1, wherein the output is configured to indicate a fault condition of a component of the fluid filter or the handling apparatus when the condition data differs from the expected change in fluid filter condition by a fourth predetermined amount.

10. The system according to claim 1, wherein the processor is configured to produce a different alert or notification depending on a value of the predetermined amount.

11. The system according to claim 1, comprising an output device in communication with the processor, wherein the output device is configured to indicate the alert or notification to the operator, optionally wherein the output device is an audio and/or display device.

12. The system according to claim 1, wherein the telemetry module is configured to transmit condition data related to the parameter from the first sensor assembly to the processor using a radio connection to a gateway hub.

13. The system according to claim 1, wherein the first sensor assembly comprises at least one fluid quality sensor configured to monitor fluid quality downstream of the fluid filter.

14. The system according to claim 13, wherein the at least one fluid quality sensor is configured to monitor at least one of: particulates, carbon dioxide, volatile organic compounds, temperature, and/or humidity.

15. The system according to claim 1, wherein the sensor arrangement comprises a mounting arrangement configured to mount the sensor arrangement to the at least one fluid filter, and wherein the mounting arrangement comprising at least one duct connection point.

16. The system according to claim 1, comprising a second fluid filter, and wherein the sensor arrangement comprises a second sensor assembly configured to monitor a parameter associated with a condition of the second fluid filter.

17. The system according to claim 1, comprising a battery configured to power the sensor arrangement, and wherein the processor is configured to monitor a level of charge of the battery and produce an output when the level of charge of the battery drops below a predetermined threshold.

18. A system for monitoring a fluid filter of a fluid handling apparatus, the system comprising:

at least one fluid filter installed in the fluid handling apparatus;

a sensor arrangement comprising a first sensor assembly configured and arranged to monitor a parameter associated with a condition of the at least one fluid filter, and a telemetry module configured to transmit condition data related to the parameter monitored by the first sensor assembly to a processor at a different location to the fluid handling apparatus, wherein the processor is configured to analyze the condition data over a predetermined period to determine an expected change in fluid filter condition; and wherein the processor is configured to compare the expected change in fluid filter condition with the condition data, and to provide an output when the condition data differs from the expected change in fluid filter condition by a predetermined amount;

wherein the output is configured to indicate a replacement condition of the fluid filter when the condition data differs from the expected change in fluid filter condition by a second predetermined amount.

19. A system for monitoring a fluid filter of a fluid handling apparatus, the system comprising:

at least one fluid filter installed in the fluid handling apparatus;

a sensor arrangement comprising a first sensor assembly configured and arranged to monitor a parameter associated with a condition of the at least one fluid filter, and a telemetry module configured to transmit condition data related to the parameter monitored by the first sensor assembly to a processor at a different location to the fluid handling apparatus, wherein the processor is configured to analyze the condition data over a predetermined period to determine an expected change in fluid filter condition; and wherein the processor is configured to compare the expected change in fluid filter condition with the condition data, and to provide an output when the condition data differs from the expected change in fluid filter condition by a predetermined amount;

wherein the output is configured to indicate a collapsed condition of the fluid filter when the condition data differs from the expected change in fluid filter condition by a third predetermined amount.

20. A system for monitoring a fluid filter of a fluid handling apparatus, the system comprising:

at least one fluid filter installed in the fluid handling apparatus;

a sensor arrangement comprising a first sensor assembly configured and arranged to monitor a parameter associated with a condition of the at least one fluid filter, and a telemetry module configured to transmit condition data related to the parameter monitored by the first sensor assembly to a processor at a different location to the fluid handling apparatus, wherein the processor is configured to analyze the condition data over a predetermined period to determine an expected change in fluid filter condition; and wherein the processor is configured to compare the expected change in fluid filter condition with the condition data, and to provide an output when the condition data differs from the expected change in fluid filter condition by a predetermined amount;

wherein the output is configured to indicate a fault condition of a component of the fluid filter or the handling apparatus when the condition data differs from the expected change in fluid filter condition by a fourth predetermined amount.

* * * * *